(12) United States Patent
Del Toro et al.

(10) Patent No.: US 9,259,614 B2
(45) Date of Patent: Feb. 16, 2016

(54) SPORTS TRAINING DEVICE

(75) Inventors: Jesus Deval Del Toro, Valencia (ES);
Jose Sancho Garcia, Valencia (ES);
Jose Fernando Garcia Checa, Valencia (ES)

(73) Assignee: BKOOL, S.L. (ES)

( * ) Notice: Subject to any disclaimer, the term of this patent is extended or adjusted under 35 U.S.C. 154(b) by 194 days.

(21) Appl. No.: 13/877,256

(22) PCT Filed: Sep. 29, 2011

(86) PCT No.: PCT/ES2011/070685
§ 371 (c)(1),
(2), (4) Date: May 1, 2013

(87) PCT Pub. No.: WO2012/042092
PCT Pub. Date: Apr. 5, 2012

(65) Prior Publication Data
US 2013/0210582 A1  Aug. 15, 2013

(30) Foreign Application Priority Data

Oct. 1, 2010 (ES) .................................. 201031461

(51) Int. Cl.
*A63B 71/00* (2006.01)
*A63B 24/00* (2006.01)
(Continued)

(52) U.S. Cl.
CPC ......... *A63B 24/0062* (2013.01); *A63B 21/0051* (2013.01); *A63B 21/00069* (2013.01);
(Continued)

(58) Field of Classification Search
CPC ............... A63B 24/00; A63B 24/0062; A63B 24/0084; A63B 21/0051; A63B 21/0088; A63B 21/225; A63B 2220/17; A63B 2220/51; A63B 2220/80; A63B 2230/01; A63B 2230/04; A63B 2230/202; A63B 2230/207; A63B 2230/50
USPC .......................................... 482/1–9, 900–902
IPC ....................................................... A63B 24/00
See application file for complete search history.

(56) References Cited

U.S. PATENT DOCUMENTS

| 6,450,922 B1 * | 9/2002 | Henderson et al. ............... 482/8 |
| 2003/0051952 A1 | 3/2003 | Mercante |

(Continued)

FOREIGN PATENT DOCUMENTS

WO  2006/102529  9/2006

OTHER PUBLICATIONS

International Search Report of Feb. 23, 2012.

*Primary Examiner* — Glenn Richman
(74) *Attorney, Agent, or Firm* — Gerald E. Hespos; Michael J. Porco; Matthew T. Hespos (57) ABSTRACT

The present invention relates to a training device usable in both indoor and outdoor training sessions, linked to a communication network capable of connecting multiple remote users during shared training sessions. Said device comprises, among other elements, a training means which presents a variable resistance against a physical force applied by a user; a monitoring and communication unit of data regarding the physical condition of the user and the mechanical conditions of the training means; a simulation and control unit; and a plurality of sensors for acquiring information on the physical condition of the user, on the mechanical conditions of the training means and on the user's environment.

27 Claims, 4 Drawing Sheets

(51) Int. Cl.

| | | |
|---|---|---|
| *A63B 21/005* | (2006.01) | |
| *A63B 69/16* | (2006.01) | |
| *G06Q 10/06* | (2012.01) | |
| *A63B 21/00* | (2006.01) | |
| *A63B 21/22* | (2006.01) | |
| *A63B 22/06* | (2006.01) | |
| *A63B 71/06* | (2006.01) | |
| *A63B 21/008* | (2006.01) | |

(52) U.S. Cl.
CPC ......... *A63B21/00076* (2013.01); *A63B 21/225* (2013.01); *A63B 22/0605* (2013.01); *A63B 24/0084* (2013.01); *A63B 69/16* (2013.01); *G06Q 10/0639* (2013.01); *A63B 21/0088* (2013.01); *A63B 71/0619* (2013.01); *A63B 71/0622* (2013.01); *A63B 2024/009* (2013.01); *A63B 2024/0096* (2013.01); *A63B 2069/165* (2013.01); *A63B 2069/167* (2013.01); *A63B 2210/50* (2013.01); *A63B 2220/10* (2013.01); *A63B 2220/17* (2013.01); *A63B 2220/51* (2013.01); *A63B 2220/80* (2013.01); *A63B 2225/20* (2013.01); *A63B 2225/50* (2013.01); *A63B 2230/01* (2013.01); *A63B 2230/04* (2013.01); *A63B 2230/202* (2013.01); *A63B 2230/207* (2013.01); *A63B 2230/50* (2013.01); *A63B 2230/75* (2013.01)

(56) References Cited

U.S. PATENT DOCUMENTS

| | | |
|---|---|---|
| 2005/0008992 A1 | 1/2005 | Westergaard et al. |
| 2006/0234840 A1* | 10/2006 | Watson et al. .................. 482/61 |
| 2007/0219059 A1* | 9/2007 | Schwartz et al. ................. 482/8 |
| 2010/0222179 A1* | 9/2010 | Temple et al. .................... 482/8 |
| 2011/0237400 A1* | 9/2011 | King et al. ......................... 482/8 |
| 2011/0251021 A1* | 10/2011 | Zavadsky et al. ................. 482/5 |

* cited by examiner

SPORTS TRAINING DEVICE

BACKGROUND OF THE INVENTION

1. Field of the Invention

The present invention relates to a sports training device useable for both indoor and outdoor training sessions, linked to a communication network capable of connecting multiple remote users in shared training sessions.

2. Description of the Related Art

Indoor sports training devices are well-known in the state of the art and are commonly used by professional users as well as sports enthusiasts. Initially, said devices were conceived as alternatives to outdoor training, for cases where the user did not wish to leave an enclosed precinct in order to practice sport, due, for example, to the weather conditions outside, the comfort of exercising in one's own home, or the convenience of combining a specific training exercise with other sports practices, which can all be practiced in the same enclosure. Widely disclosed examples are treadmills, which are very common in gyms and sports centres, stationary bicycles or rowing machines, among many others.

Despite the fact that the above examples of indoor training systems offer an adequate solution for many users in their usual practice, the aforesaid devices still present several drawbacks which the state of the art has not yet resolved, mostly related to the main disadvantage that said indoor devices present against practicing exercise outdoors, i.e., the lack of a natural environment (whether urban or rural) where the activity can be performed, often causing users the sensation that the exercise has become repetitive or boring, and leading occasionally to the loss of interest in the activity or even abandonment of the sports practice. Another problem resulting from indoor training devices, in cases where said devices allow electronic analyses to be made of the exercise performed (by studying the distances run, the speed, the resistance that the device applies as the user progresses, etc.) is their incompatibility with simultaneous planning of outdoor exercise, because there is no tool to provide a common reference framework that can integrate the two types of training naturally, whereby the user can view both types jointly (through a common data acquisition and analysis system) in a unified training plan. This incompatibility can cause the user to perceive indoor training as a less effective alternative to outdoor training, which can only be carried out independently in respect of the former.

The present invention aims to resolve the aforesaid drawbacks, by means of a device that incorporates different elements for sports practice in both indoor and outdoor mode with training means that are easy to use, together with a simulator managed on the basis of the information generated by a Web application, which includes a customisable training system, in addition to recovery and analysis of the data generated by users during their sports practice. The aforesaid system helps to improve the quality of training and physical performance through a process, which users can configure by varying their training routines according to their requirements. Additionally, the invention allows practice by multiple users simultaneously, and can also be configured in competition mode, which provides a greater sensation of training, together with the possibility of integrating real training sessions performed outdoors so that they can later be reproduced during an indoor practice session using the simulator installed on the device, or of sharing them with other remote users, by means of the Web application. The device presents, also, the advantage of being able to record information on the user's physical condition (heart rate, blood pressure, calories burned, etc.), and also on the mechanical parameters of the training device employed (speed, acceleration, rotation, etc.), whether outdoors or indoors during the whole of the sports practice.

SUMMARY OF THE INVENTION

One object of the present invention is a sports training device which comprises a training means with, at least one, rotatable member having variable resistance against a physical force applied by a user; a monitoring and communication unit of data regarding the physical condition of the user and regarding the mechanical condition of the training means; a training simulation and control unit connected to the monitoring and communication unit; wherein the simulation and control unit comprises one or more systems to control the variation in resistance applied by the rotatable member of the training means, wherein said variation is carried out through a wireless communication with the monitoring and communication unit; and wherein said monitoring and communication unit is, likewise, connected to one or more sensors of the physical condition of the user and to one or more sensors of the mechanical conditions of the training means.

In a preferred embodiment of the invention, the training means comprises a bicycle.

In a preferred embodiment of the invention the rotatable member of the training means comprises a roller attachable to one of the bicycle wheels.

In a preferred embodiment of the invention the rotatable member comprises, likewise, a braking system for said member.

In a preferred embodiment of the invention the braking system of the rotatable member comprises a metal disc and, at least, two permanent magnets having a variable position attachable to said disc.

In a preferred embodiment of the invention the permanent magnets of the braking system are made of neodymium and the metal disc is made of aluminium.

In a preferred embodiment of the invention, the permanent magnets can move by means of an actuator, so as to vary the surface of the magnets that faces the metal disc.

In a preferred embodiment of the invention the actuator comprises an electric stepper motor attached to a spindle that, by means of a nut, moves a carriage in which the magnets are installed.

In a preferred embodiment of the invention the braking system of the rotatable member comprises a centrifugal ventilator moved by the motion of the roller.

In a preferred embodiment of the invention the braking system comprises an axle guided by two bearings, with the roller situated between them and dragged by the bicycle wheel.

In a preferred embodiment of the invention the training means comprise a stabilisation system which consists of, at least, a frame supported on the ground and attachable to the bicycle by means of one or more joining means such as screws, clamps, brakes or similar devices, in such a way that the latter cannot move laterally or longitudinally during practice.

In a preferred embodiment of the invention the training means comprises a treadmill.

In a preferred embodiment of the invention, the monitoring and communication unit of the physical condition of the user and of the mechanical conditions of the training means comprises a wireless access to a communications network having one or more of the following connections: Wi-Fi (understanding this term to refer to any wireless local area network), by means of an Ethernet standard network, Bluetooth, radiofrequency systems, mobile telephone communication networks, infrared, TCP/IP (Transmission control protocol/Internet protocol), HTTP (Hypertext transfer protocol), a "peer to peer" protocol, FTP (File transfer protocol), RTP (Real-time transport protocol), RTSP (Real-time streaming protocol), SSH (Secure shell), voice over IP (VOIP) or USB (Universal serial bus).

In a preferred embodiment of the invention the monitoring and communication unit comprises digital storage means for the data measured by the sensors during training.

In a preferred embodiment of the invention the sensors of the physical condition of the user comprise one or more of the following: heart rate sensor, blood pressure sensor, blood oxygen saturation sensor, glucose concentration sensor, calories sensor, body mass index sensor, temperature sensor.

In a preferred embodiment of the invention the sensors of the mechanical conditions of the training means comprise one or more of the following: speed of rotation of the rotatable member sensor, accelerometer of the rotatable member, cadence sensor of the user's stride, cadence sensor of the user's pedalling, sensor of the force applied by the user, user activity sensor, user position sensor.

In a preferred embodiment of the invention, the monitoring and communication unit comprises a means of communication over a GPS network (Global positioning system) in order to provide information on the user's environment.

In a preferred embodiment of the invention the simulation and control unit comprises programmable means for the user to be able to design training sessions and the control systems to run them, said sessions characterised in that they comprise a variable configuration of the resistances of the rotatable member over time in the course of practice.

In a preferred embodiment of the invention the simulation and control unit comprises a monitor for viewing the data acquired by the sensors and/or the force of resistance applied to the rotatable member.

In a preferred embodiment of the invention the data on the resistance force applied to the rotatable member viewed on the monitor are represented in the form of surface inclination data.

One object of the present invention is a sports training device comprising, additionally, a system for planning training remotely, connected to the simulation and control unit by means of an internet connection.

In a preferred embodiment of the invention the remote planning system comprises a wireless connection to the monitoring and communication unit.

In a preferred embodiment of the invention the remote planning system comprises programmable means for the digital storage and analysis of the data acquired from the sensors.

In a preferred embodiment of the invention the monitoring and communication unit comprises a wireless connection to a mobile telephone.

In a preferred embodiment of the invention, the monitoring and communication unit is integrated in a mobile telephone.

In a preferred embodiment of the invention the monitoring and communication unit comprises a wireless connection to a video camera.

In a preferred embodiment of the invention the number of means of training and of users is comprised between 1 and 64.

Although the majority of the embodiments of the invention described in this document are aimed at the practice of cycling, it would be simple, for a person skilled in the art, to transfer the object of the invention to the performance of other sports activities in the light of the description of the present invention.

Other characteristics and advantages of the invention can be inferred from the description that follows and from the drawings that are attached hereto.

DETAILED DESCRIPTION OF THE PREFERRED EMBODIMENTS

Figure 1:
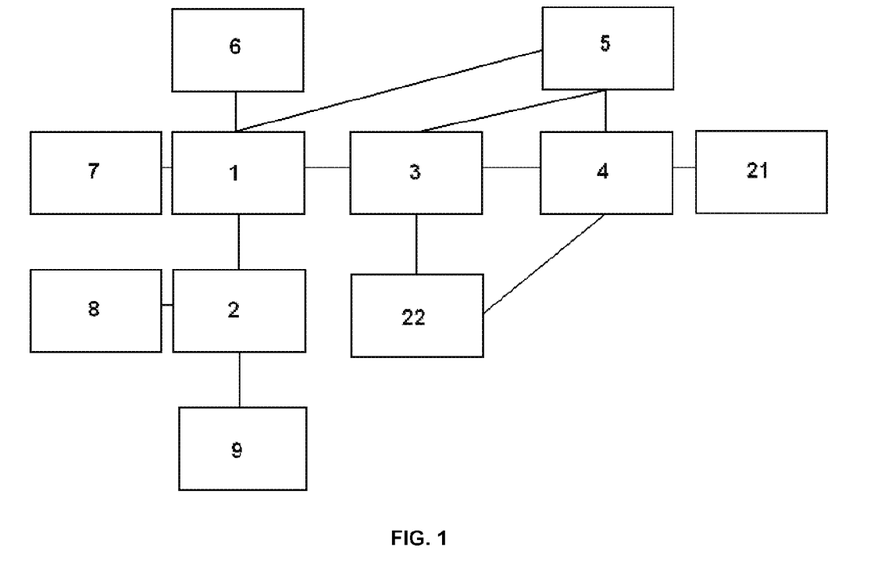
FIG. 1 shows an outline of the main elements of the device of the invention, together with their connections within the communication network that they form.

As shown in FIGS. 1-4 of this document, the present invention consists of a sports training device comprising the following elements:

A) A training means (1): This element comprises all of the systems used by the user to perform the physical activity indoors. Preferably, the training means consists of a bicycle designed for cycling indoors or outdoors, although other embodiments of the invention may comprise another type of system, such as programmable treadmills, rowing practice machines, stepper-type devices, stationary or "spinning" bicycles, fitness machines or any other system having similar characteristics.

The training means (1) has, at least, one rotatable member (2) which presents a variable resistance against a force applied by the user while conducting the sports activity. Said force may be, for example, the force applied by legs and feet during pedalling, the force applied by legs and feet while running, or the force of arms and hands to move an oar. In different embodiments of the invention, the rotatable members (2) may comprise, for example, a bicycle wheel, one or more rollers on which a treadmill rolls, or an axle on which an oar turns in a rowing machine.

Figure 2:
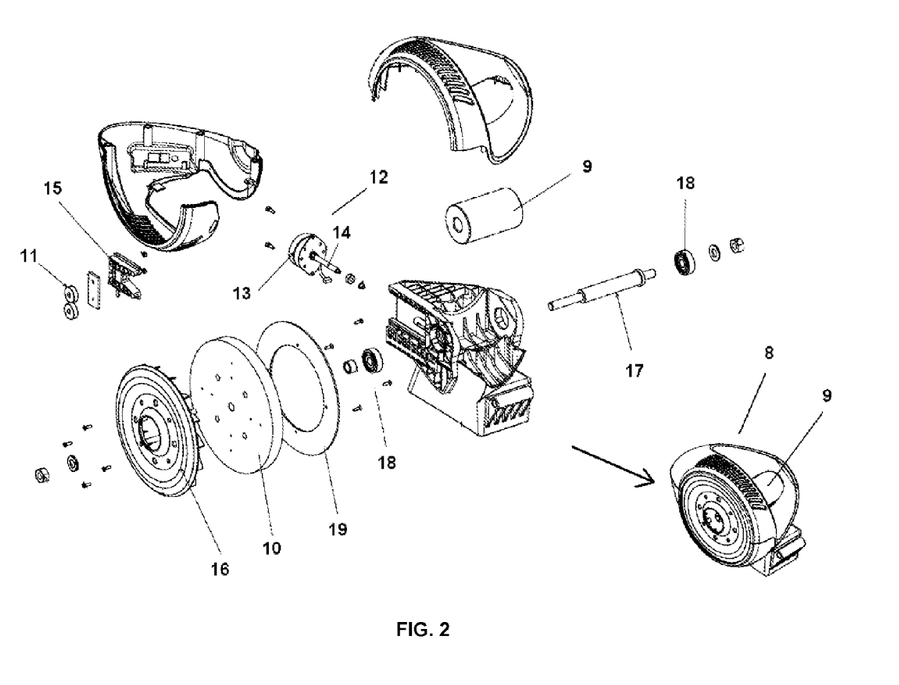
FIG. 2 shows a view in perspective of the braking system of the training means in a preferred embodiment of the invention, displaying its main internal components.
Figure 3:
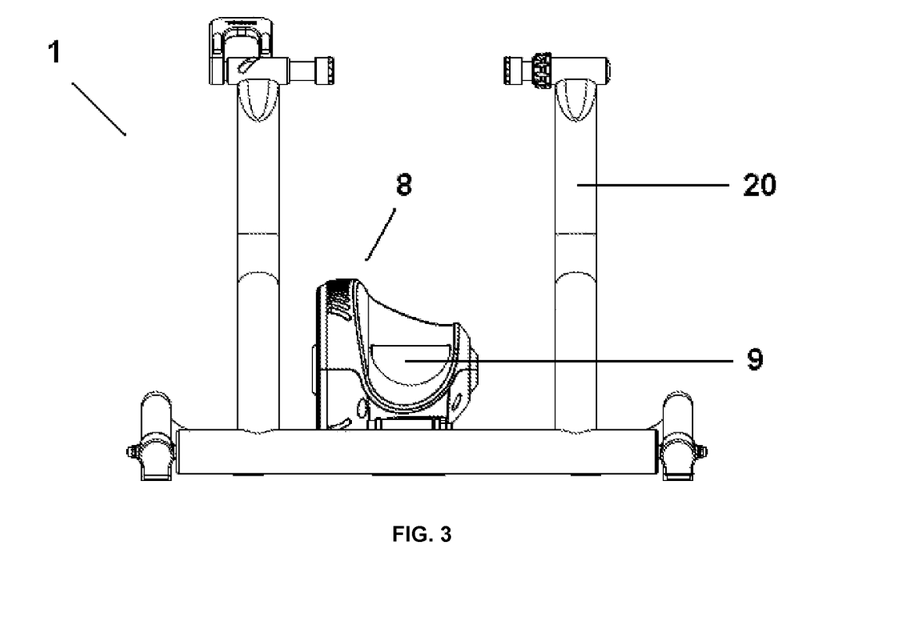
FIG. 3 shows an elevation view of a training means in a preferred embodiment of the present invention, together with a frame attachable to the axle of a bicycle's back wheel.
Figure 4:
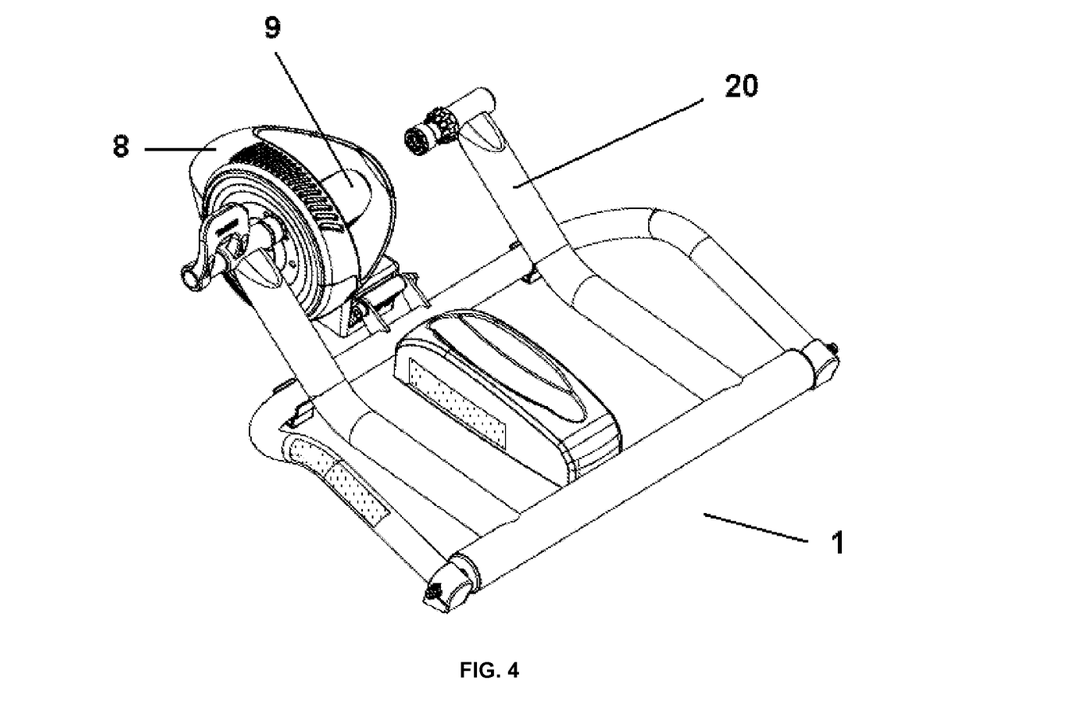
FIG. 4 shows a view in perspective of a training means in a preferred embodiment of the present invention, together with a frame attachable to the axle of a bicycle's back wheel.

In another preferred embodiment of the invention, wherein the training means (1) comprises a bicycle, one of the rotatable members (2) is a roller (9) attachable to the back wheel of the bicycle, in such a way that said wheel makes the roller (9) turn, with the movement transmitted by the force of the user through the bicycle pedals. In the absence of other forces, the roller (9) turns freely with the movement transmitted by the bicycle wheel. With a view to providing a variable resistance to the force applied by the user, the training means (1) comprises, at the same time, a braking system (8) of the roller (9), which makes it possible to reproduce situations very close to reality in terms of resistance, positive slope perception on the part of the user and sensations of pedalling on the road. Preferably, the braking system (8) of the roller (9) comprises, at least, the following elements:

A metal disk (10), preferably made of aluminium, which turns jointly with the roller (9).

At least, two permanent magnets (11), aimed at the metal disk (10), offering alternate poles towards it (north and south), capable of being situated at a variable distance from said metal disk (10), and being moveable, preferably, by means of an actuator (12), in such a way that the surface of the magnets (11) facing the metal disk (10) varies. By means of the actuator, the poles of the magnets (11) aimed towards the metal disk (10) can be completely outside the area of the latter (thereby obtaining a minimum braking power) or completely within the area of the disk (10) (maximum braking power). The actuator (12) comprises, preferably, an electric stepper motor (13) attached to a spindle (14) which moves, by means of a nut, a carriage (15) in which the magnets (11) are installed.

The braking principle in the embodiment of the invention just described is based on making a magnetic field generated by the magnets (11) pass over the metal disk (10) which turns jointly with the roller (9) dragged by the bicycle, thereby generating Foucault currents as the disk (10) moves in relation to the magnetic field, creating a brake torque through the interaction of said currents and the magnetic field; and generating the heat currents through the Joule effect, with a power equivalent to the braking power. In a preferred embodiment of the invention, the magnetic field is generated by means of two magnets (11) made of neodymium (although, in other embodiments, other magnets can also be used), whose field crosses the space projected by the surface of the metal disk (10). By varying the position of the magnets (11) and, consequently, the magnetic field that affects the metal disk (10), it is possible to regulate the magnetic flow that crosses said disk (11) and, therefore, the brake power, which will be greater the higher the turning speed in the roller (9).

In a preferred embodiment of the invention, in order to evacuate the heat generated in the metal disk (10), a centrifugal ventilator (16) is used moved by the motion of the roller (9) itself, which drives the air through the inside of the braking system (8).

In a preferred embodiment of the invention, the braking system (8) comprises an axle (17) guided by two bearings (18), with the roller (9) being situated between them dragged by the bicycle wheel. At one end of the axle (17) there is a flywheel (19), for the purpose of making pedalling more regular, imitating the inertia effect that the mass of the cyclist plus the bicycle would have on the real road. The flywheel (19) also serves the function of simulating the inertia efforts present when accelerating, due to the mass of the cyclist and the bicycle.

In order to prevent the bicycle from moving from its position during exercise, the present invention comprises, additionally, a stabilisation system consisting of a frame (20) supported on the ground and attachable to the bicycle by means of one or more joining means such as screws, clamps, brakes or similar devices, in such a way that it does not move laterally or longitudinally throughout the duration of the exercise. The back wheel of the bicycle is attached to the frame (20) by its axle, with its front wheel being, preferably supported on a base that equals the height of the wheels, restricts their turning and provides stability to the assembly. The braking system (8) is located on the rear part of the frame (20). The frame (20) is of the tilting type, in such a way that it is the weight of the cyclist that brings the back wheel onto the roller (9), on which a contact force is exerted proportional to the cyclist's weight. This type of tilting design allows one single frame to be used for various sizes and types of bicycles.

In another aspect of the invention, the training means (1) can be fitted with one or more sensors of the mechanical conditions (7) of the training means (1), such as a sensor of the speed of the rotatable member (2), an accelerometer of the rotatable member (2), an inclinometer, a cadence sensor of the user's stride, a cadence sensor of the user's pedalling, a sensor of the power of the force applied by the user, a sensor of the user's activity, a sensor of the user's position or any other similar sensors known in the state of the art and used in indoor or outdoor training devices.

In a similar fashion, the present invention also incorporates the possibility of installing one or more sensors for acquiring information on the physical condition of the user (6), said sensors being, preferably, a heart rate or pulse sensor, a blood pressure sensor, a blood oxygen saturation sensor, a blood glucose concentration sensor, a calories sensor, a sensor of the body mass index, a temperature sensor or any other similar sensors used in sports practice.

B) A training simulation and control unit (4): Said unit is designed, on the one part, to receive information detected by the various sensors (6, 7) installed on the training means (1) and on the user, and, on the other part, to control the variation in resistance presented by the rotatable member (2) of the training means (1) against the force applied by the user. Preferably, the simulation and control unit (4) is a computer provided with a control system (5) which comprises the interaction between programmable software and hardware, together with a communication protocol capable of receiving the data acquired by the sensors (6, 7), as well as giving instructions to the training means (1), preferably to the braking system (8) of the roller (9) comprised on the rotatable member (2). In alternative embodiments of the invention, other types of devices equipped with processing means, such as tablet devices, notebooks, mobile telephones or other analogous systems of the state of the art, can also be used as simulation and control units (4). In this way, it is possible to programme training sessions pre-designed in the simulation and control unit (4) of the device, and for the user to perform them through a combination of variable resistances of the rotatable member (2) over time, which the user perceives as a route with a varying slope.

The communication protocol used by the control system (5) of the simulation and control unit (4) is, preferably an ANT+ protocol (wireless network protocol based on radiofrequency transmission technology at 2.4 Ghz), extensively used in the state of the art belonging to sensor monitoring for sport applications. Nonetheless, other communication protocols may be likewise implemented in the unit (4).

In a preferred embodiment of the invention, the simulation and control unit (4) comprises, also, a monitor (21) for viewing the data acquired by the sensors (6, 7) and/or the force of resistance applied to the rotatable member (2) against the force applied by the user. This viewing may be represented, by means of the hardware and software programmed in the simulation and control unit (4), for example, as a succession of stretches of surface having a different slope depending on the resistance force applied to the rotatable member (2). This makes the user perceive training as if following a real route across terrain with a variable slope.

C) One monitoring and communication unit (3) of data regarding the physical condition of the user and the mechanical conditions of the training means (1): this unit is a small-sized portable device which establishes a communication network between the training means (1) and the simulation and control unit (4), receiving and transmitting the signals sent through the communication protocol used in said simulation and control unit (4), and receiving and transmitting the data sent from the sensors (6, 7).

The established communication network is preferably a wireless network. Said network may be established by means of any device, system, circuit or combination thereof (including any infrastructure of wireless communications such as communications towers or communications servers) capable of providing a connection by means of a short range or long range protocol. The communication network may be based, for example, on a Wi-Fi connection (this term being understood as referring to any wireless local area network), by means of an Ethernet standard network, Bluetooth, radiofrequency systems, mobile telephone communication networks, infrared, TCP/IP (Transmission control protocol/internet protocol), HTTP (Hypertext transfer protocol), a "peer to peer" protocol, FTP (File transfer protocol), RTP (Real-time transport protocol), RTSP (Real-time streaming protocol), SSH (Secure shell), voice over IP (VOIP) or USB (Universal serial bus), in addition to any combination of the above.

An important advantage that the monitoring and communication unit (3) provides to the device of the invention is the possibility of using it also in outdoor sessions, which is possible in practice thanks to its portable and wireless nature. In fact, in different embodiments of the invention, said unit may be implemented in a small-sized device that the user can carry, for example, inside one of their pockets.

In particular, for a preferred embodiment of the invention wherein the training means (1) comprises a bicycle, it is possible to remove said bicycle from the frame used to stabilise it and from the training roller (9), and to conduct one or more sessions outdoors, keeping the communication network connected through the monitoring and communication unit (3), receiving the data acquired by the sensors (6, 7) and transmitting it to the simulation and control unit (4) for subsequent processing and analysis. The data acquired may be used, for example, to configure indoor training routes based on real data acquired during the outdoor training session (data on effort, speed, slope, acceleration, etc.). In this preferred embodiment, the back wheel of the bicycle acts as the rotatable member (2) of the training means (1).

The presence of the monitoring and communication unit (3) on the device of the invention and the establishment of a wireless connection between the training means (1), the sensors (6, 7) and the simulation and control unit (4), provides the present device, as described above, with the capacity to combine indoor training sessions with outdoor training sessions in the same operating context, providing a synergy between the individual benefits of each of said modes of training. On the one part, the indoor training sessions are perceived by the user as being less artificial, given the availability of a simulation and control unit (4) capable of reproducing very similar training sessions, in terms of effort, as the ones performed outdoors and, on the other part, the outdoor training sessions serve as a source of data for generating indoor sessions, allowing the user to repeat them the number of times required according to needs, using them as a training routine before, for example, an outdoor race, or even sharing the data on outdoor sessions with other users, giving the device a greater social dimension.

In a preferred embodiment of the invention, the monitoring and communication unit (3) comprises also an independent power system, said system being, preferably, a rechargeable battery.

In a preferred embodiment of the invention, the monitoring and communication unit (3) may, additionally, comprise digital storage means of the data measured by the sensors (6, 7) during training, said memory being, preferably, a USB memory, a flash memory card, a SIM (Subscriber identity module) card, a hard disk or any other equivalent device. This offers the possibility of transmitting the data acquired directly to the monitoring and communication unit (3), transferring them afterwards to the simulation and control unit (4) at any time after the sports practice. The connection between the digital storage means and the simulation and control unit (4) may be achieved by means of either wireless communication or through cable (for example, by means of a USB connection). The cable connection may also be used to recharge the power supply system of the unit (3).

In another preferred embodiment of the invention, the monitoring and communication unit (3) comprises communication means over a GPS network (Global positioning system). This makes it possible to transmit, in addition to the data acquired by the sensors (6, 7), data regarding the user's position during outdoor sessions, it being possible to use such data as complementary information for the design of the indoor training sessions using the simulation and control unit (4).

In other embodiments of the invention, the monitoring and communication unit (3) comprises a wireless or cable connection to a video camera installed, for example, on the training means (1), which can be used by the user during sessions outdoors. The images acquired by the camera can be used by the simulation and control system (4), whether for incorporation into the pre-designed training sessions (showing them on the viewing monitor (21)), combining them with the data obtained through the GPS communication means or any of the sensors (6, 7) used in the device, it being possible to compare them with other users. It is also possible to connect the camera, through a cabled or wireless connection, to the simulation and control unit (4). In a preferred embodiment of the invention, the link between the GPS communication means, the video camera and an inclinometer allows information to be obtained for the subsequent generation of indoor simulation sessions.

In another preferred embodiment of the invention, the monitoring and communication unit (3) comprises a keyboard with programmed functionalities for configuring said unit (3) and performing the basic functions thereof, such as, for example activation or deactivation of the sensors (6, 7), storage of acquired data, or transfer of the information to the simulation and control unit (4).

In another preferred embodiment of the invention, the monitoring and communication unit (3) comprises a wireless connection to a mobile telephone and programmed software through which it is possible to carry out, using said telephone, the basic functions of said unit (3), such as activation or deactivation of the sensors (6, 7), storage of acquired data, or transfer of the information to the simulation and control unit (4). It is also possible, by means of a combination of the hardware and software programmable in the mobile telephone, together with the communications appropriate for each embodiment, for the mobile telephone itself to be the monitoring and communication unit (3).

In another preferred embodiment of the invention, multiple users can be connected to a single simulation and control unit (4), by means of a plurality of monitoring and communication units (3), through a common communication protocol.

D) A remote training-planning system (22): said system is connected to the simulation and control unit (4) and to the monitoring and communication unit (3), preferably, by means of an internet connection. Said system allows the remote generation of content useable by the simulation and control unit (4) in the form of data for the indoor sessions, and also as a means of communication between different remote users, in the form of a "social network". The remote planning system comprises a combination of hardware and/or software, which comprises elements such as server-client systems, databases, controllers, communication protocols, and web applications. Communication between the remote training-planning system (22) and the other elements of the present invention can be achieved by means of any communication protocol and distributed hypermedia commonly used in the state of the art. In an embodiment of the invention, the communication protocol used is a REST protocol (Representational State Transfer). The objective of the remote training-planning system (22) is to provide means for assisting the sports practice of users, as well as allowing communication and interaction between them. In different embodiments of the invention, the remote planning system of training (22) comprises the following functionalities:

Designing customized training routines, assisted remotely by an expert.
Creating a historical record of training data.
Managing sports groups formed by users.
Creating individual training sessions.
Creating individual competition sessions.
Creating multiuser training sessions.
Creating multiuser competition sessions.

Another important functionality of the remote training-planning system (22) is the design and monitoring of the sports training of users by means of a plurality of processes programmed in said system, capable, on the one part of performing a detailed typifying of the physical condition of each user (by studying parameters such as their weight, height, level of physical activity, maximum heart rate, heart rate at rest, body mass index, their functioning power threshold (FPT), etc.), as well as to generate, according to the information obtained on the user's physical condition, customised training plans (said plans comprising, preferably, daily/weekly sessions, objectives to be achieved, work cycles, sessions planned indoors, outdoors or combined, etc.).

With regard to multi-user sessions, the remote connection through a web service allows simultaneous sessions to be conducted for a plurality of users. In a preferred embodiment of the invention, the number of users in a simultaneous session is comprised between 1 and 64. Nonetheless, other embodiments with a higher number of users are equally possible.

Having described the present invention and some of its preferred embodiments, it is important to note that said embodiments must not be considered as limiting against variations in their design or combination of elements comprising the device, on condition that said variations do not alter the essence of the invention or its purpose.

The invention claimed is:

1. Sports training device comprising:
a training means (1) with, at least, one rotatable member (2) having a variable resistance against a physical force applied by a user;
at least one first sensor (6) for monitoring at least one physical condition of the user;
at least one second sensor (7) for monitoring at least one mechanical condition of the training means;
a monitoring and communication unit (3) for monitoring data regarding the at least one physical condition of the user and the at least one mechanical condition of the training means (1) and transmitting the data; and
a training simulation and control unit (4) connected to the monitoring and communication unit (3) and receiving the data regarding the at least one physical condition of the user and the at least one mechanical condition of the training means, the training simulation and control unit (4) comprises one or more control systems (5) controlling variation in resistance applied by the rotatable member (2) of the training means (1) through a wireless connection between the training simulation and control unit (4) and the monitoring and communication unit (3); and
a remote planning system (22) connected to the monitoring and communication unit (3) and the training simulation and control unit (4) by means of an Internet connection, wherein
the remote planning system (22) is configured to generate a training plan based on the data regarding the at least one physical condition of the user and the at least one mechanical condition of the training means.

2. The device of claim 1, wherein the training means (1) comprises a bicycle.

3. The device of claim 2, wherein the rotatable member (2) of the training means (1) comprises a roller (9) attachable to one of the wheels of the bicycle.

4. The device of claim 3, wherein the rotatable member (2) comprises, likewise, a braking system (8) of the roller (9).

5. The device of claim 4, wherein the braking system (8) of the rotatable member (2) comprises a metal disk (10) and, at least, two permanent magnets (11) having a variable position attachable to said disk (10).

6. The device of claim 5, wherein the permanent magnets (11) of the braking system (8) are made of neodymium and the metal disk (10) is made of aluminium.

7. The device of claim 5, wherein the permanent magnets (11) can be moved by means of an actuator (12), in such a way that the surface of the magnets (11) that faces the metal disk (10) varies.

8. The device of claim 7, wherein the actuator (12) comprises an electric stepper motor (13) attached to a spindle (14) that moves a carriage (15) in which the magnets (11) are installed.

9. The device of claim 4, wherein the braking system (8) of the rotatable member (2) comprises a centrifugal ventilator (16) moved by the motion of the roller (9) itself.

10. The device of claim 4, wherein the braking system (8) comprises an axle (17) guided by two bearings (18), between which the roller (9) is situated which is carried by the bicycle wheel and where, on said axle (17), a flywheel (19) is located.

11. The device of claim 2, wherein the training means (1) comprise a stabilisation system consisting of a frame (20) supported on the ground and attachable to the bicycle through one or more joining means, in such a way that said bicycle cannot move laterally or longitudinally.

12. The device of claim 1, wherein the training means (1) comprises a treadmill.

13. The device of claim 1, wherein the monitoring and communication unit (3) of the physical condition of the user and of the mechanical conditions of the training means (1) comprises a wireless access to a communications network with one or more of the following connections: Wi-Fi, Ethernet, Bluetooth, radiofrequency systems, mobile telephone communication networks, infrared, TCP/IP, HTTP, BitTorrent, FTP, RTP, RTSP, SSH, voice over IP, USB.

14. The device of claim 1, wherein the monitoring and communication unit (3) comprises means for digitally storing the data measured by the sensors (6, 7) during training.

15. The device of claim 1, wherein the sensors of the physical condition of the user (6) comprise one or more of the following: heart rate/pulse sensor, blood pressure sensor, blood oxygen saturation sensor, blood glucose concentration sensor, calories sensor, body mass index sensor, temperature sensor.

16. The device of claim 1, wherein the sensors of the mechanical conditions (7) of the training means (1) comprise one or more of the following: turning speed of the rotatable member sensor (2), accelerometer of the rotatable member (2), inclinometer, cadence sensor of the user's steps, cadence sensor of the user's pedalling, sensor of the power of the force applied by the user, user activity sensor, user position sensor.

17. The device of claim 1, wherein the monitoring and communication unit (3) comprises a means of communication over a GPS network.

18. The device of claim 1, wherein the simulation and control unit (4) comprises programmable means for designing training session which the user can configure and the control system (5) can run, said session being characterized in that they comprise a variable configuration of the resistances of the rotatable member (2) throughout the duration of training.

19. The device of claim 1, wherein the simulation and control unit (4) comprises a monitor (21) for viewing the data acquired by the sensors (6, 7) and/or the force of resistance applied to the rotatable member (2).

20. The device of claim 19, wherein the data regarding the force of resistance applied to the rotatable member (2) viewed on the monitor (21) are displayed as surface inclination data.

21. The device of claim 1, wherein the remote training planning system (22) comprises a wireless connection to the monitoring and communication unit (3).

22. The device of claim 1, wherein the remote training planning system (22) comprises programmable means for the digital storage and analysis of the data acquired by the sensors (6, 7).

23. The device of claim 1, wherein the monitoring and communication unit (3) comprises a wireless connection to a mobile telephone.

24. The device of claim 1, wherein the monitoring and communication unit (3) is integrated into a mobile telephone.

25. The device of claim 1, wherein the monitoring and communication unit (3) comprises a wireless or cable connection to a video camera.

26. The device of claim 1, wherein the simulation and control unit (4) comprises a wireless or cable connection to a video camera.

27. The device of claim 1, wherein the number of training means (1) and/or of users is comprised between 1 and 64.

* * * * *